(No Model.)
R. M. HUNTER.
ELECTRIC RAILWAY.
No. 438,847. Patented Oct. 21, 1890.
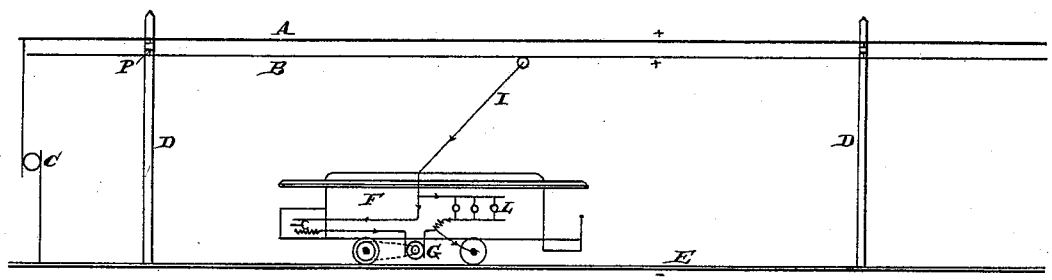
FIG. 1
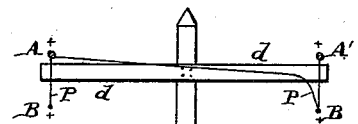
FIG. 2
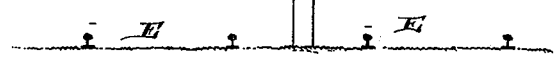
FIG. 3
Attest
E. A. Shuster
M. L. Holmes
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 438,847, dated October 21, 1890.

Original application filed March 16, 1888, Serial No. 267,367. Divided and this application filed June 24, 1890. Serial No. 356,517. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements which are fully set forth in the following specification and shown in the accompanying drawings which form a part thereof.

This application (Case 149) is a division of my application, Serial No. 267,367, filed March 16, 1888.
In carrying out my invention I provide a series of poles or supports extending along a railway between two tracks, and upon these supports I arrange in any suitable manner the conductor or conductors which supply current to the electrically-propelled vehicle or car running upon the track or tracks below. I also arrange upon these poles, if desired, the supply conductor or conductors, which are connected at intervals in parallel with the other or working conductors. The supply conductor or conductors may be insulated. Both the outgoing and the return conductors may be supported on poles, or the rails and earth may be used as the return-conductors, or, if desired, separate insulated return-conductors may be used in place of rails. The suspended conductors are preferably supported at a higher elevation than the car-roof, so as to be out of reach of persons on the railway, and the current is collected by a collector device of any suitable construction attached to the car, extending to the conductors, and making, preferably, an under-running contact therewith. Any form of collector may be used in connection with my improved circuits. With double tracks the poles are erected between the tracks and have cross-arms at the top, from which are suspended the working-conductors in a manner to bring them within reach of the collectors of the car. In the case where there is only one suspended working-conductor for each track the said suspended working-conductors are of like polarity and are preferably connected in parallel.

In the drawings, Figure 1 is a longitudinal elevation of an electric railway embodying my invention, and Figs. 2 and 3 are cross-sections showing two modifications thereof.

A is the supply-conductor.
B are the working-conductors.
C is the electric generator for furnishing electricity to the supply-conductor.

D are the poles, and E are the rails, which may act as the return-conductors, if desired.

The current from the generator C goes out the supply-conductor and passes by branch conductors P to the working-conductors B, from which it is taken by the collector I of the car, and after energizing the motor which propels the car or other translating device passes to the return-conductors E.

In the construction shown in Figs. 2 and 3 we have double tracks E E, and the conductors A B are supported by posts D, arranged between the tracks and provided with cross-arms $d$ at the top.

I do not confine myself to any type of post, as it may be plain or ornamented and of wood or metal.

The cross-arms $d$ extend out transversely from each side of the post to a point preferably above the middle of the railways E E, and the working-conductors B are supported from the outer ends, while the supply-conductor A may be supported at any place desired and connected with the working-conductors by branch conductors P.

F is the car, and is propelled by the motor G, mechanically arranged to rotate the axle.

L are electric lamps to light the car.

The current is supplied from the collector I to the motor and lamps by suitable conductors on the cars.

In Fig. 2 the conductor A is arranged above the upper part of the cross-arm and to the outer end thereof, and the conductor B is suspended therefrom over one track, and the conductor B over the other track is suspended from the other end of the cross-bar $d$ and is electrically connected by the branch conductor P with the supply-conductor A. It is quite evident that the supply-conductor may be divided or formed of two longitudinal conductors A A' and both be connected in parallel with the positive conductors B.

In Fig. 3 the supply-conductor is supported by the cross-arms *d* near the vertical post D, and the working-conductors B are suspended from the ends of the arms and connected with the supply-conductor A by the branch conductors P. In this case the weight of the large supply-conductor is near the vertical post, and less strain comes upon the cross-arms. In all of these cases the conductors are suspended below the ends of the arms *d* and are exposed from below, so that the collector extending upwardly from the car may travel in connection with the under side of said conductors. The said conductor may be a wire or cable and bare or insulated, while the working-conductor would in all cases be bare and preferably smaller.

In all cases the supply and working conductors are sustained by the same means of support and held out of reach of persons on the cars or railway, and also provide sufficient height between the road-bed and the conductors to enable vehicles of all kinds to readily pass beneath them.

It will be observed that in my improvements the supply-conductor and working-conductors are connected in parallel and supported from the opposite sides of the arms of posts, so that the working-conductor is arranged upon the side adjacent to the track, leaving an unobstructed passage-way between the conductor and track.

Having now described my invention, what I claim as new, and desire to secure by Letters Patent, is—

1. The combination of a railway-track, a series of posts or poles arranged along said track, a supply-conductor and a working-conductor connected in parallel and suspended upon the opposite sides or portions of said posts at an elevation above the track, and so that the surface of the working-conductor adjacent to the track is unobstructed, a traveling car, an electric motor to propel said car, a collector moving with the car and making a traveling contact with the unobstructed part of the suspended working-conductor, and a motor-circuit on the car for supplying current from the collector to the motor.

2. The combination of a railway-track, a series of posts or poles extending along the railway, a working-conductor suspended therefrom on the side adjacent to the track, leaving an unobstructed passage-way between the conductor and track, a supply-conductor also supported by the poles or posts, but upon the distant side thereof and out of reach from the track, and connecting-conductors for coupling the supply and working conductors in parallel.

3. The combination of a railway-track, a series of stationary supports extending along the track, a working-conductor suspended below the supports, a supply-conductor suspended above the supports, and connecting-circuits for coupling the supply and working conductors in parallel.

4. A railway-track, combined with a series of vertical posts arranged along the track and having a lateral or transverse arm at their upper parts extending over the track, a suspended working-conductor supported by said arm at its free end and presenting an unobstructed under surface, a supply-conductor supported by the posts and connected in parallel with the working-conductor, a traveling car, an electric motor mechanically connected to rotate the axle of the car, a current-collecting conductor extending from the car and making a traveling contact with the working-conductor, and a motor-circuit carried by the car to supply current from the collector to the motor.

5. A railway-track, a series of posts arranged along said railway-track, having lateral or transverse arms extending over the track, a working-conductor suspended below the said arms, a supply-conductor suspended above said arms, and electrical connections between the said conductors, whereby they are connected in parallel.

6. A railway-track, a series of posts arranged along said railway-track, having lateral or transverse arms extending over the track, a working-conductor suspended below the said arms, a supply-conductor suspended above said arms, electrical connections between the said conductors whereby they are connected in parallel, an electrically-propelled vehicle on the track below said arms and working-conductor, and an upwardly-extending collector-conductor moving with the vehicle making a continuous contact with the working-conductor.

7. A railway-track, a series of posts arranged along said railway-track, having lateral or transverse arms extending above the track, a working-conductor suspended below the said arms, a supply-conductor suspended above said arms, electrical connections between said conductors whereby they are connected in parallel, a source of electric supply connecting with the supply-conductor and rails of the track, an electrically-propelled vehicle on the track below said arms and working-conductor, and a collector carried with the vehicle making a moving contact with the working-conductor.

8. The combination of two parallel tracks, a series of posts or poles arranged between the tracks and having cross-arms extending transversely over each track, a working-conductor suspended from each of the cross-arms and over the respective tracks, a supply-conductor also suspended by said poles and connected to the two working-conductors in parallel, a traveling car, and a current-collecting device carried with the car and adapted to make contact with the suspended conductor of either track when the car is on the corresponding track.

9. The combination of two railway-tracks, a series of posts or poles arranged between them and provided with transverse cross-arms at their upper parts extending out over either track, a working-conductor suspended from each of said arms over the middle of the corresponding track, and connecting-circuits for coupling the said conductors in parallel.

10. The combination of two railway-tracks, a series of posts or poles arranged between them and provided with transverse or cross arms at their upper parts extending out over both tracks, a working-conductor suspended from each of said arms over substantially the middle of the corresponding track, connecting-circuits for coupling the said conductors in parallel, and a supply-conductor supported by said posts or their cross-arms and electrically connected with said connecting-conductors so as to be connected in parallel with the working-conductors.

11. The combination of two railway-tracks, a series of posts or poles arranged between them and provided with transverse cross-arms at their upper parts extending out over either track, a working-conductor suspended from each of said arms substantially over the middle of the corresponding tracks, connecting-circuits for coupling the said conductors in parallel, a supply-conductor supported by said posts or their cross-arms and electrically connected with said connecting-conductors, so as to be connected in parallel with the working-conductors, an electrically-propelled car, and a current-collecting device carried with the car for making a traveling contact with the working-conductor and supplying current to the motor on the car.

12. The combination of a railway-track, a series of stationary supports extending laterally over the track, a small working-conductor suspended from the stationary supports, a large supply-conductor supported upon the stationary supports, branch conductors for connecting the working and supply conductors in parallel, and a source of electric energy connecting with the supply-conductor.

In testimony of which invention I have hereunto set my hand.

R. M. HUNTER.

Witnesses:
ERNST HOWARD HUNTER,
S. T. YERKES.